(12) United States Patent
Maleport

(10) Patent No.: US 11,468,781 B2
(45) Date of Patent: Oct. 11, 2022

(54) SIMULATION OF AN ASSET INCLUDING MESSAGE PLAYBACK USING NESTED HASH TABLES

(71) Applicant: THE BOEING COMPANY, Chicago, IL (US)

(72) Inventor: Joel J. Maleport, O'Fallon, MO (US)

(73) Assignee: The Boeing Company, Chicago, IL (US)

( * ) Notice: Subject to any disclaimer, the term of this patent is extended or adjusted under 35 U.S.C. 154(b) by 762 days.

(21) Appl. No.: 15/674,812

(22) Filed: Aug. 11, 2017

(65) Prior Publication Data

US 2019/0051206 A1 Feb. 14, 2019

(51) Int. Cl.
| | | |
|---|---|---|
| *G06F 16/901* | (2019.01) | |
| *G09B 9/02* | (2006.01) | |
| *G09B 9/00* | (2006.01) | |
| *G06F 9/54* | (2006.01) | |

(52) U.S. Cl.
CPC ............... *G09B 9/02* (2013.01); *G06F 9/542* (2013.01); *G06F 16/9014* (2019.01); *G09B 9/00* (2013.01)

(58) Field of Classification Search
CPC ......... G09B 9/02; G09B 9/00; G06F 16/9014; G06F 9/542
USPC ....................................................... 707/747
See application file for complete search history.

(56) References Cited

U.S. PATENT DOCUMENTS

| | | | | |
|---|---|---|---|---|
| 7,058,639 B1 * | 6/2006 | Chatterjee | ........... | G06F 16/2255 |
| 7,228,258 B2 * | 6/2007 | Farr | ....................... | G09B 9/003 |
| | | | | 434/30 |
| 9,804,752 B1 * | 10/2017 | Mall | ..................... | G06F 3/0484 |
| 2002/0059210 A1 * | 5/2002 | Makus | .................. | G06F 16/904 |
| 2003/0220999 A1 * | 11/2003 | Emerson | .............. | H04N 21/231 |
| | | | | 709/224 |

(Continued)

FOREIGN PATENT DOCUMENTS

| | | |
|---|---|---|
| CN | 103914565 A | 7/2014 |
| CN | 105099698 A | 11/2015 |

(Continued)

OTHER PUBLICATIONS

Extended European Search Report dated Aug. 3, 2018 in corresponding European application No. 18179232.6.

(Continued)

*Primary Examiner* — Hung T Vy
(74) *Attorney, Agent, or Firm* — Womble Bond Dickinson (US) LLP

(57) ABSTRACT

An apparatus is provided for simulation of an asset to train a user to use the asset. The apparatus includes persistent storage to store raw binary data transformable into messages associated with simulation of the asset, and a random access memory (RAM) to store a protocol name, sender identifier and message type of the messages in respective hash tables. These hash tables further include a fourth hash table that maps times of the messages to the raw binary data in the persistent storage. In response to a request for playback of messages from a selected time, the apparatus locates the raw binary data for a message chronologically last in time before the selected time using the four nested hash tables in the RAM, retrieves the raw binary data for the message from its location in the persistent storage medium, and transforms the raw binary data into the message for presentation.

27 Claims, 6 Drawing Sheets

(56) References Cited

U.S. PATENT DOCUMENTS

| | | | |
|---|---|---|---|
| 2005/0289190 A1* | 12/2005 | Powell | G06F 16/31 |
| 2012/0156653 A1 | 6/2012 | Wokurka | |
| 2012/0168653 A1* | 7/2012 | Ejiri | F16K 1/305 |
| | | | 251/28 |
| 2013/0179522 A1* | 7/2013 | Hardy | H04L 51/26 |
| | | | 709/206 |
| 2014/0297652 A1* | 10/2014 | Stevens | H04L 43/06 |
| | | | 707/741 |
| 2015/0052203 A1* | 2/2015 | Karnin | H04L 51/16 |
| | | | 709/206 |

FOREIGN PATENT DOCUMENTS

| | | |
|---|---|---|
| CN | 105335300 A | 2/2016 |
| CN | 106134200 A | 11/2016 |
| CN | 106446140 A | 2/2017 |
| WO | 01/53950 A2 | 7/2001 |

OTHER PUBLICATIONS

Office Action dated Aug. 17, 2021 in the corresponding Chinese Application No. 2018108401446.
Office Action from the corresponding European Application No. 18179232.6, dated Aug. 5, 2020, 8 pages.

* cited by examiner

SIMULATION OF AN ASSET INCLUDING MESSAGE PLAYBACK USING NESTED HASH TABLES

TECHNOLOGICAL FIELD

The present disclosure relates generally to a training system for an asset and, in particular, a training system including simulation of a moving asset including message playback using nested hash tables.

BACKGROUND

Training exercises are often performed for aircraft and other moving assets. These training exercises are used to teach pilots how to operate the asset. Additionally, the exercises are also used to train users on different strategies and tactics with respect to operating the asset. In the context of military aircraft, for example, pilots may train in an aircraft to improve skills and reactions to adversarial events. These events may include, for example, without limitation, encountering enemy aircraft, reacting to a presence of surface-to-air missile sites, engaging time sensitive targets and other suitable events.

A large amount of training may be performed using training devices on the ground. These training devices often take the form of simulators such as flight simulators for aircraft and spacecraft. A flight simulator is a system that copies or simulates the experience of flying an aircraft. A flight simulator is meant to make the experience as real as possible. Flight simulators may range from controls and a display in a room to a full-size replica of a cockpit mounted on actuators that are configured to move the cockpit in response to actions taken by a pilot. These types of simulators provide a capability to teach pilots and/or other crew members to operate various aircraft systems and to react to different events.

It is common practice that simulation environments provide the ability to stop, rewind and replay parts of a simulation, and then continue at the current simulation time, much like a digital video recorder. However, simulations are not simply a sequence of screen images that can be recorded and replayed. Instead, images displayed in simulations are generated based upon various parameters that determine the current state of a simulation. Those parameters do not evolve and change in deterministic lock-step, but rather change independently at different points in time and may change based upon simulation events rather than a common clock cycle.

In a simulation environment, functions like stop, rewind, replay and continue require recording the various parameters that determine current state and reconstruction of state using the recorded parameters.

For simple or short-duration simulations, the parameters that determine current state can be recorded sequentially in random access memory (RAM) for fast rewind and replay. For complex and long duration simulations, the volume of required data exceeds what may be reasonably stored in RAM. Instead data must be recorded to slower persistent storage. If recorded sequentially, stop and rewind to a specific point in time may require reading a large volume of data sequentially from the beginning of the simulation file to restore an accurate state.

Therefore it would be desirable to have an apparatus and method that takes into account at least some of the problems discussed above, as well as other possible issues.

BRIEF SUMMARY

Example implementations of the present disclosure are directed to an apparatus, method and computer-readable storage medium for simulation of an asset to train a user to use the asset. According to example implementations, raw binary data associated with simulation of an asset may be structured, stored and replayed using nested hash tables in RAM to quickly locate the data stored in persistent storage. The data may be replayed at faster or slower than real-time. The simulation may also jump around in time in a non-contiguous fashion and view a reconstructed picture of the simulation's state data at any given point in time based on the raw binary data.

In accordance with some example implementations, the raw binary data may be or include packets of binary data received over a network from one or more senders or sources. A user may request playback of data from a selected point in time, and the nested hash tables in RAM allows the apparatus to easily and quickly determine what data was last transmitted by each sender/source before a given point in time. The data is stored in, and once determined retrieved from persistent storage, such as in a database or flat binary file. The data may then be reloaded such that the simulation's internal state is restored the same state it was in when the packet data was originally recorded.

The present disclosure thus includes, without limitation, the following example implementations.

Some example implementations provide an apparatus for simulation of an asset to train a user to use the asset, the apparatus comprising a persistent storage medium configured to store raw binary data transformable into messages associated with simulation of the asset, the persistent storage medium being configured to store the raw binary data with associated metadata that identifies a protocol, sender and message type of the messages by respectively a protocol name, sender identifier and message type; a random access memory (RAM) configured to store the protocol name, sender identifier and message type, and excluding the raw binary data, the RAM being configured to store the protocol name, sender identifier and message type in respective hash tables of four nested hash tables further including a fourth hash table that maps points in time of the messages to respective data indices that identify respective locations in the persistent storage medium at which the raw binary data for the messages are stored; a user input interface configured to receive a request for playback of a portion of the messages from a selected point in time that is earlier than a time at which the request is received; and a processor configured to execute computer-readable program code to cause the apparatus to respond to the request, including for each point in time of a plurality of points in time including and from the selected point in time, the apparatus being caused to at least: locate the raw binary data for a message whose point in time is chronologically last before the point in time using the four nested hash tables in the RAM and without access to the persistent storage medium, including the apparatus being caused to loop over the protocol name, sender identifier and message type in the respective hash tables to identify a data index in the fourth hash table that identifies a location in the persistent storage medium at which the raw binary data for the message is stored; retrieve the raw binary data for the message from the location in the persistent storage medium using the data index; and transform the raw binary data into the message for presentation in connection with simulation of the asset to train the user to use the asset.

In some example implementations of the apparatus of the preceding or any subsequent example implementation, or any combination thereof, the apparatus further comprises a display device configured to present the message for each point in time of the plurality of points in time.

In some example implementations of the apparatus of any preceding or any subsequent example implementation, or any combination thereof, the messages include messages of multiple protocols, senders or message types, and wherein the apparatus being caused to locate the raw binary data, retrieve the raw binary data and transform the raw binary data includes being caused to locate the raw binary data, retrieve the raw binary data and transform the raw binary data for the message of each combination of protocol, sender and message type that is chronologically last before the point in time.

In some example implementations of the apparatus of any preceding or any subsequent example implementation, or any combination thereof, the messages include messages of multiple protocols, senders or message types, and the apparatus being caused to locate the raw binary data includes being caused to locate the raw binary data for the message of each combination of protocol, sender and message type whose point in time is chronologically last before the point in time, and wherein the apparatus being caused to retrieve the raw binary data for the message incudes for the message of each combination of protocol, sender and message type, the apparatus being caused to at least: compare the data index for the raw binary data for the message of the combination of protocol, sender and message type with a last presented index that identifies the data index for the raw binary data for a last presented message of the combination of protocol, sender and message type; and retrieve the raw binary data for the message of the combination of protocol, sender and message type only when the data index and the last presented index are different.

In some example implementations of the apparatus of any preceding or any subsequent example implementation, or any combination thereof, the plurality of points in time are earlier than the selected point in time and in reverse chronological order.

In some example implementations of the apparatus of any preceding or any subsequent example implementation, or any combination thereof, the messages associated with simulation of the asset include messages for presentation at a predetermined rate, and wherein the apparatus being caused to transform the raw binary data includes being caused to transform the raw binary data into the message for presentation at a rate that is different from the predetermined rate over the plurality of points in time including and from the selected point in time.

In some example implementations of the apparatus of any preceding or any subsequent example implementation, or any combination thereof, the fourth hash table maps the points in time of the messages to respective cache entries that store the respective data indices and any logic for presentation of messages of a particular protocol, sender or message type, and wherein for at least one message of the particular protocol, sender or message type, the apparatus being caused to locate the raw binary data for the message includes being caused to locate the raw binary data according to the logic.

In some example implementations of the apparatus of any preceding or any subsequent example implementation, or any combination thereof, the raw binary data is historical raw binary data, the messages are historical messages, and the apparatus further comprises a communication interface configured to receive live raw binary data transformable into live messages associated with simulation of the asset, and wherein the processor is configured to execute computer-readable program code to cause the apparatus to further at least: transform the live raw binary data into the live messages; populate the four nested hash tables in the RAM with the protocol name, sender identifier and message type of the live messages, and with points in time of the live messages, the fourth hash table mapping the points in time of the live messages to respective data indices that identify respective locations in the persistent storage medium in which to store the live raw binary data for the live messages; and write the live raw binary data to the respective locations in the persistent storage medium with associated metadata that identifies the protocol name, sender identifier and message type of the live messages, the live raw binary data and live messages thereafter being historical raw binary data and historical messages.

Some example implementations provide a method of simulation of an asset to train a user to use the asset, the method comprising storing, in a persistent storage medium, raw binary data transformable into messages associated with simulation of the asset, the persistent storage medium storing the raw binary data with associated metadata that identifies a protocol, sender and message type of the messages by respectively a protocol name, sender identifier and message type; storing, in a random access memory (RAM), the protocol name, sender identifier and message type, and excluding the raw binary data, the RAM storing the protocol name, sender identifier and message type in respective hash tables of four nested hash tables further including a fourth hash table that maps points in time of the messages to respective data indices that identify respective locations in the persistent storage medium at which the raw binary data for the messages are stored; receiving a request for playback of a portion of the messages from a selected point in time that is earlier than a time at which the request is received; and responding to the request, including for each point in time of a plurality of points in time including and from the selected point in time, a processor at least: locating the raw binary data for a message whose point in time is chronologically last before the point in time using the four nested hash tables in the RAM and without access to the persistent storage medium, including looping over the protocol name, sender identifier and message type in the respective hash tables to identify a data index in the fourth hash table that identifies a location in the persistent storage medium at which the raw binary data for the message is stored; retrieving the raw binary data for the message from the location in the persistent storage medium using the data index; and transforming the raw binary data into the message for presentation in connection with simulation of the asset to train the user to use the asset.

In some example implementations of the method of any preceding or any subsequent example implementation, or any combination thereof, the method further comprises presenting, on a display device, the message for each point in time of the plurality of points in time.

In some example implementations of the method of any preceding or any subsequent example implementation, or any combination thereof, the messages include messages of multiple protocols, senders or message types, and wherein locating the raw binary data, retrieving the raw binary data and transforming the raw binary data includes locating the raw binary data, retrieving the raw binary data and transforming the raw binary data for the message of each combination of protocol, sender and message type that is chronologically last before the point in time.

In some example implementations of the method of any preceding or any subsequent example implementation, or any combination thereof, the messages include messages of multiple protocols, senders or message types, and locating the raw binary data includes locating the raw binary data for the message of each combination of protocol, sender and message type whose point in time is chronologically last before the point in time, and wherein retrieving the raw binary data for the message incudes for the message of each combination of protocol, sender and message type, the processor at least: comparing the data index for the raw binary data for the message of the combination of protocol, sender and message type with a last presented index that identifies the data index for the raw binary data for a last presented message of the combination of protocol, sender and message type; and retrieving the raw binary data for the message of the combination of protocol, sender and message type only when the data index and the last presented index are different.

In some example implementations of the method of any preceding or any subsequent example implementation, or any combination thereof, the plurality of points in time are earlier than the selected point in time and in reverse chronological order.

In some example implementations of the method of any preceding or any subsequent example implementation, or any combination thereof, the messages associated with simulation of the asset include messages for presentation at a predetermined rate, and wherein transforming the raw binary data includes transforming the raw binary data into the message for presentation at a rate that is different from the predetermined rate over the plurality of points in time including and from the selected point in time.

In some example implementations of the method of any preceding or any subsequent example implementation, or any combination thereof, the fourth hash table maps the points in time of the messages to respective cache entries that store the respective data indices and any logic for presentation of messages of a particular protocol, sender or message type, and wherein for at least one message of the particular protocol, sender or message type, locating the raw binary data for the message includes locating the raw binary data according to the logic.

In some example implementations of the method of any preceding or any subsequent example implementation, or any combination thereof, the raw binary data is historical raw binary data, the messages are historical messages, and the method further comprises: receiving live raw binary data transformable into live messages associated with operation of the; transforming the live raw binary data into the live messages; populating the four nested hash tables in the RAM with the protocol name, sender identifier and message type of the live messages, and with points in time of the live messages, the fourth hash table mapping the points in time of the live messages to respective data indices that identify respective locations in the persistent storage medium in which to store the live raw binary data for the live messages; and writing the live raw binary data to the respective locations in the persistent storage medium with associated metadata that identifies the protocol name, sender identifier and message type of the live messages, the live raw binary data and live messages thereafter being historical raw binary data and historical messages.

Some example implementations provide a computer-readable storage medium for simulation of an asset to train a user to use the asset, the computer-readable storage medium being non-transitory and having computer-readable program code portions stored therein that in response to execution by a processor, cause an apparatus to at least perform the method of any preceding example implementation, or any combination thereof.

These and other features, aspects, and advantages of the present disclosure will be apparent from a reading of the following detailed description together with the accompanying drawings, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as combinable, unless the context of the disclosure clearly dictates otherwise.

It will therefore be appreciated that this Brief Summary is provided merely for purposes of summarizing some example implementations so as to provide a basic understanding of some aspects of the disclosure. Accordingly, it will be appreciated that the above described example implementations are merely examples and should not be construed to narrow the scope or spirit of the disclosure in any way. Other example implementations, aspects and advantages will become apparent from the following detailed description taken in conjunction with the accompanying drawings which illustrate, by way of example, the principles of some described example implementations.

BRIEF DESCRIPTION OF THE DRAWING(S)

Having thus described example implementations of the disclosure in general terms, reference will now be made to the accompanying drawings, which are not necessarily drawn to scale, and wherein:

FIG. 1 schematically illustrates a training system for a moving asset according to example implementations of the present disclosure;

DETAILED DESCRIPTION

Figure 1:
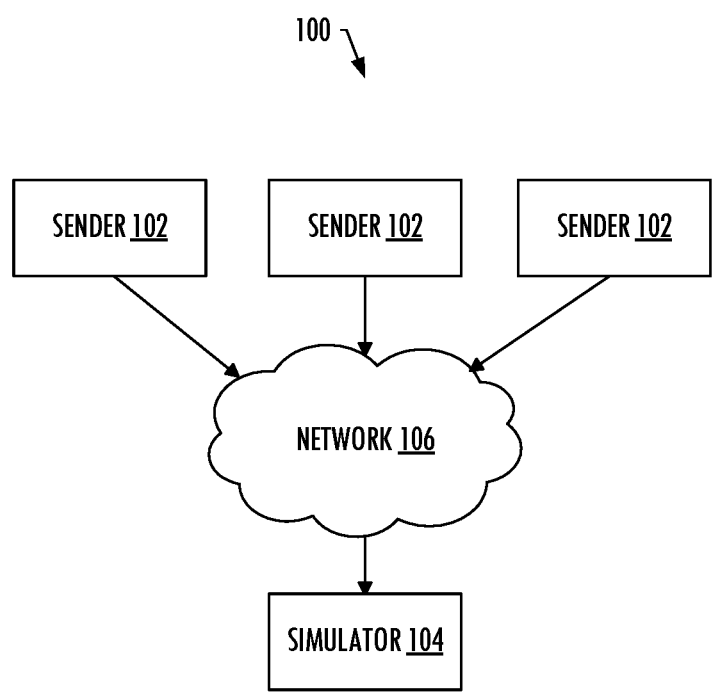

Some implementations of the present disclosure will now be described more fully hereinafter with reference to the accompanying drawings, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. For example, unless otherwise indicated, reference to something as being a first, second or the like should not be construed to imply a particular order. Also, for example, reference may be made herein to quantitative measures, values, relationships or the like. Unless otherwise stated, any one or more, if not all, of these may be absolute or approximate to account for acceptable variations that may occur, such as those due to engineering tolerances or the like. Like reference numerals refer to like elements throughout.

Example implementations of the present disclosure are generally directed to a training system for an asset and, in particular, a training system including simulation of a moving asset including message playback using nested hash tables. While the present disclosure will be described in connection with a flight training system having aircraft assets, it can be appreciated that the present disclosure applies to any training application involving a moving asset. Examples of a suitable moving asset include vehicles such as land vehicles (ground vehicles), rail vehicles, aircraft (air vehicles), spacecraft, watercraft and the like. Other examples of a suitable moving asset include satellites, missiles, advanced kill vehicles and the like.

FIG. 1 illustrates a training system 100 for a moving asset according to example implementations of the present disclosure. The system may include any of a number of different subsystems (each an individual system) for performing one or more functions or operations. As shown, in some examples, the system includes one or more of each of a sender or source (generally "sender") 102 of messages associated with simulation of the asset, and a simulator 104 to train a user to use an asset, which in some examples communicate with one another across one or more computer networks 106. In some examples, the senders are other simulators of other assets that interact with the simulator to implement a simulation environment in which simulations of the asset and other assets interact with one another. It should also be understood that the system may include one or more additional or alternative subsystems than those shown in FIG. 1.

In some examples, one or more apparatuses may be provided that are configured to function as or otherwise implement the training system 100 including its senders 102 and simulator 104. In examples involving more than one apparatus, the respective apparatuses may be connected to or otherwise in communication with one another in a number of different manners, such as directly or indirectly via a wired or wireless network or the like.

Figure 2:
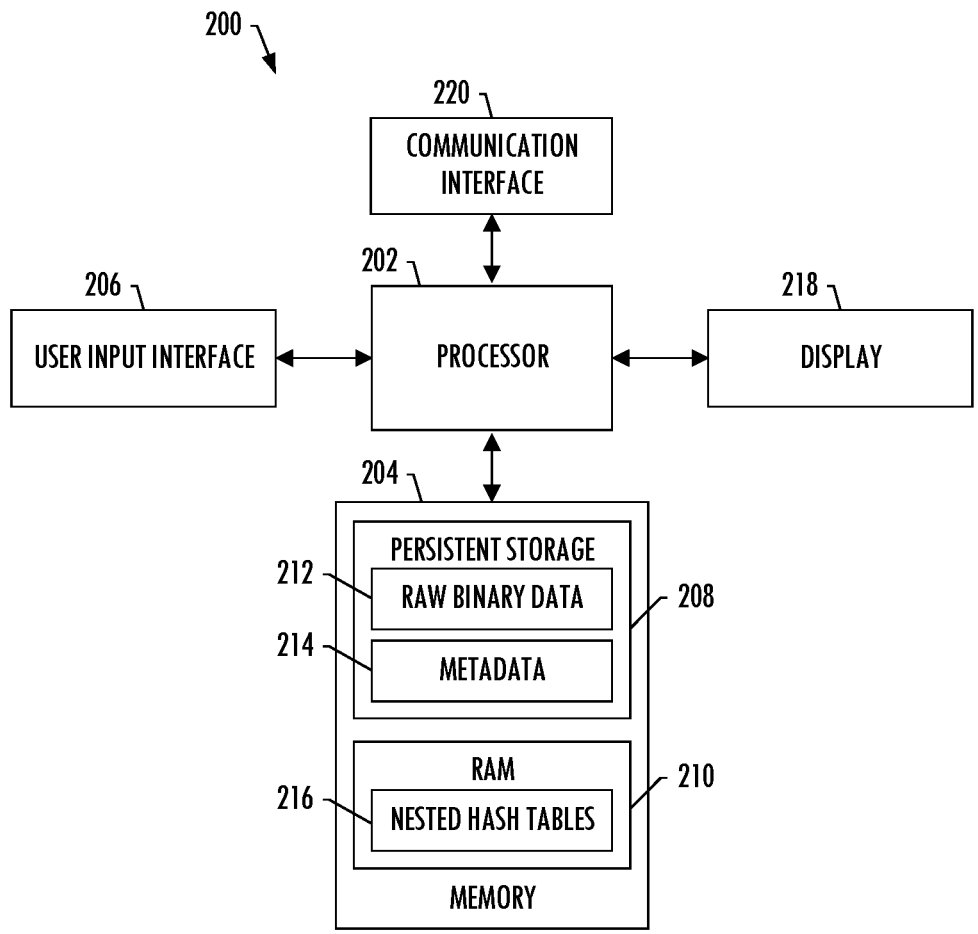
FIG. 2 illustrates an apparatus that in some examples may be configured to implement a sender or simulator of the training system of FIG. 1.

FIG. 2 more particularly illustrates an apparatus 200 that in some examples may be configured to implement a sender 102 or simulator 104, although the below description will focus on the apparatus being configured to implement the simulator. Generally, an apparatus of example implementations of the present disclosure may comprise, include or be embodied in one or more fixed or portable electronic devices. The apparatus includes one or more of each of a number of components such as, for example, a processor 202 connected to memory 204 and a user input interface 206.

As also shown, the memory 204 includes a persistent storage medium 208 (sometimes referred to as non-volatile memory) and volatile random access memory (RAM) 210. According to example implementations of the present disclosure, the persistent storage medium is configured to store raw binary data 212 transformable into messages associated with simulation of the asset. The persistent storage medium is configured to store the raw binary data with associated metadata 214 that identifies a protocol, sender 102 and message type of the messages by respectively a protocol name, sender identifier and message type.

In the context of flight simulation, examples of suitable protocols include the Distributed Interactive Simulation (DIS) protocol, the High-level Architecture (HLA) protocol, the Training Enabling Architecture (TENA) protocol, and the like. Examples of suitable senders are other simulators of other assets that interact with the simulator to implement a simulation environment in which simulations of the asset and other assets interact with one another, as indicated above. And examples of suitable message types include position reports, mission assignments, sensor detections, detonation events, and the like.

The RAM 210 is configured to store the protocol name, sender identifier and message type, and excludes the raw binary data 212. The RAM is configured to store the protocol name, sender identifier and message type in respective hash tables of four nested hash tables 216. These four nested hash tables include those for the protocol name, sender identifier and message type, and further include a fourth hash table that maps points in time of the messages to respective data indices that identify respective locations in the persistent storage medium 208 at which the raw binary data for the messages are stored.

The hash tables 216 are nested in that each hash table except for the fourth points to another of the hash tables. In some examples, the protocol name, sender identifier and message type are keys of the respective hash tables including a first hash table, a second hash table and a third hash table. The first hash table maps a first of the keys to a value that is a second of the keys, the second hash table maps the second of the keys to a value that is a third of the keys, and the third hash table maps the third of the keys to values that are points in time that are keys of the fourth hash table. The fourth hash table, again, maps points in time of the messages to respective data indices that identify respective locations in the persistent storage medium 208.

The user input interface 206 is configured to receive a request for playback of a portion of the messages from a selected point in time that is earlier than a time at which the request is received. The processor 202 is configured to execute computer-readable program code to cause the apparatus 200 to respond to the request. This computer-readable program code may be stored in the persistent storage 208, RAM 210 or other memory 204. In some examples, the computer-readable program code is stored in persistent storage and loaded into RAM for execution.

The nested hash tables 216 allow the apparatus 200 to quickly lookup the last message transmitted before the selected point in time for an associated protocol, sender and message type. This saves the expense of performing expensive database queries and avoids lengthy file serialization operations. In some examples, the nested hash tables are combined with a set of playback logic (rules) that govern whether all data of a particular type should be played back or whether sections of the data can be skipped over. So for repeating data, the apparatus is able to skip over irrelevant/redundant data and simply retrieve what would have been the last message for the protocol, sender and message type. For event driven data, the apparatus can quickly locate and replay all events leading up to a given point in time without having to query the database or scan a large file from disk.

In some examples, the apparatus 200 being caused to respond to the request includes a number of operations for each point in time of a plurality of points in time including and from the selected point in time. In this regard, apparatus is caused to locate the raw binary data 212 for a message whose point in time is chronologically last before the point in time using the four nested hash tables 216 in the RAM 210 and without access to the persistent storage medium 208. This includes the apparatus being caused to loop over the protocol name, sender identifier and message type in the respective hash tables to identify a data index in the fourth hash table that identifies a location in the persistent storage medium at which the raw binary data for the message is stored.

In some examples, the fourth hash table maps the points in time of the messages to respective cache entries that store the respective data indices and any logic for presentation of messages of a particular protocol, sender 102 or message type. In these examples, for at least one message of the particular protocol, sender or message type, the apparatus 200 is caused to locate the raw binary data according to the logic.

The apparatus 200 is caused to retrieve the raw binary data 210 for the message from the location in the persistent storage medium 208 using the data index, and transform the raw binary data into the message for presentation in connection with simulation of the asset to train the user to use the asset. In some examples, the messages include messages of multiple protocols, senders 102 or message types. In some of these examples, the apparatus is caused to locate the raw binary data, retrieve the raw binary data and transform the raw binary data for the message of each combination of protocol, sender and message type that is chronologically last before the point in time. In some examples, the apparatus further includes a display device 218 configured to present the message for each point in time of the plurality of points in time.

In some examples in which the messages include messages of multiple protocols, senders 102 or message types, the apparatus is caused to locate the raw binary data 212 includes being caused to locate the raw binary data for the message of each combination of protocol, sender and message type whose point in time is chronologically last before the point in time. In these examples, the apparatus is caused to perform a check of the raw binary data before retrieving it. That is, for the message of each combination of protocol, sender and message type, the apparatus is caused to compare the data index for the raw binary data for the message of the combination of protocol, sender and message type with a last presented index that identifies the data index for the raw binary data for a last presented message of the combination of protocol, sender and message type. And the apparatus is caused to retrieve the raw binary data for the message of the combination of protocol, sender and message type only when the data index and the last presented index are different.

The messages may be presented or otherwise played forward in which the points in time are later than the selected point in time and in forward chronological order; or the messages may be presented or otherwise played backward in which the points in time are earlier than the selected point in time and in reverse chronological order. In some examples, the messages associated with simulation of the asset include messages for presentation at a predetermined rate, and the apparatus 200 is caused to transform the raw binary data into the message for presentation at a rate that is the same as or different from the predetermined rate over the plurality of points in time including and from the selected point in time.

In some examples, the raw binary data 212 is historical raw binary data, and the messages are historical messages.

In some of these examples, the apparatus 200 further includes a communication interface 220 configured to receive live raw binary data transformable into live messages associated with simulation of the asset. The processor 202 is configured to execute computer-readable program code to cause the apparatus to further transform the live raw binary data into the live messages. The apparatus is also caused to populate the four nested hash tables 216 in the RAM 210 with the protocol name, sender identifier and message type of the live messages, and with points in time of the live messages. Similar to the historical messages, the fourth hash table maps the points in time of the live messages to respective data indices that identify respective locations in the persistent storage medium 208 to which to store the live raw binary data for the live messages. The apparatus is then caused to write the live raw binary data 212 to the respective locations in the persistent storage medium with associated metadata 214 that identifies the protocol name, sender identifier and message type of the live messages. The live raw binary data and live messages are thereafter being historical raw binary data and historical messages, and may be retrieved from the persistent storage medium as such.

Figure 3:
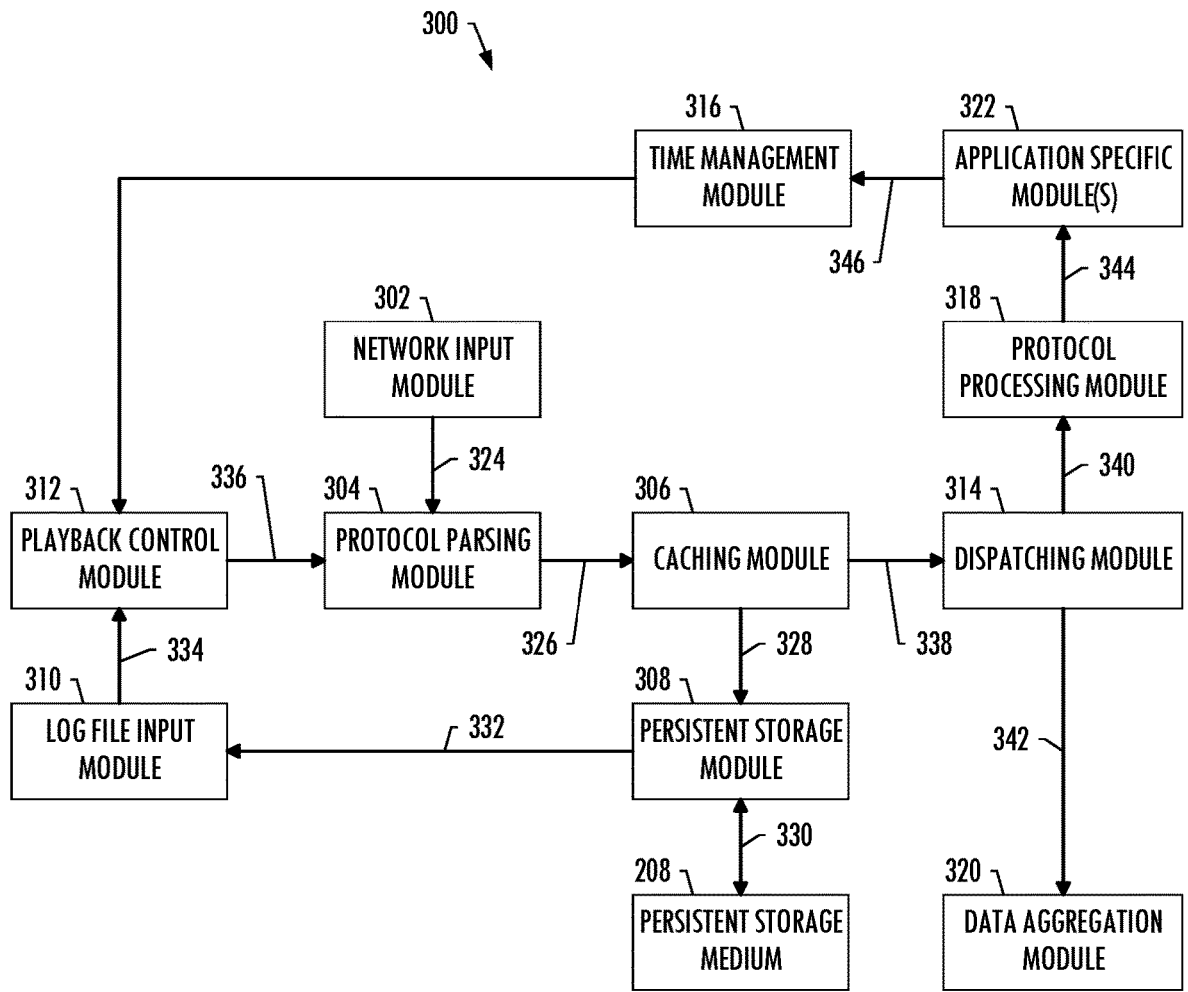
FIG. 3 illustrates a software architecture of the simulator, and may be used to illustrate operation in the case of both live and historical data, according to some example implementations.

FIG. 3 illustrates a software architecture 300 of the simulator 104 according to some example implementations of the present disclosure. The software architecture may be divided into a number of components or modules interconnected by a number of interfaces. As shown and described below, the modules include a network input module 302, a protocol parsing module 304, a caching module 306, a persistent storage module 308, a log file input module 310, a playback control module 312, a dispatching module 314, a time management module 316, a protocol processing module 318, a data aggregation module 320, and one or more application specific modules 322.

The network input module 302 is to read raw binary data such as raw binary packet data from senders 102 on the network 106. In some more particular examples, this module is to read raw binary data from a TCP or UDP socket. This module may run as a background thread. In some examples involving multiple communication interfaces 220 that simultaneously receive raw binary data, or involving multiple protocols, the software architecture may run multiple instantiations of the network input module, one for each network connection or protocol in use. An interface 324 between the network input module and the protocol parsing module 304 may be used to send the raw binary data to the protocol parsing module. Other information that may also be exchanged using this interface includes the number of bytes received, and sender identifier such as the sender's Internet Protocol (IP) address and port.

The protocol parsing module 304 is to interpret the raw binary data and convert the data into messages that are understandable by the application specific module(s) 322. The transformed data represents messages in a communication protocol. In addition to converting the raw binary data, the protocol parsing module records how many bytes were read, the type of raw binary (packet) data that was received (message type), and the sender identifier (e.g., the sender's IP address and port). An interface 326 between the protocol parsing module and the caching module 306 may be used to send the raw binary data, messages, the number of bytes received, the sender identifier, the message type and description (which may be human readable), and the protocol name (which may also be human readable). In some examples, the number of bytes received, the sender identifier, the message type and description, and/or the protocol name may be in metadata associated with the raw binary data.

The caching module 306 is to organize and index the incoming data. Organizing is the process of cataloging the received data into the four nested hash tables 216 whose purpose is to enable the quick location of data transmitted over a given protocol, sender, message type, and time without having to scan an entire set of logged messages. Indexing is the process of turning one of the four pieces of information (i.e., protocol, sender, message type, time) into a hash index.

The nested hash tables 216 (key-value maps) are stored in RAM 210 to avoid the expense of a database query or a file scan operation which would incur an undesirable amount of overhead when amount of raw binary data (e.g., the number of packets) is large. In one example, these hash tables store data in the following order: protocol, sender, message type, and time, such as in the following structure:

| Table #1 | Table #2 | Table #3 | Table #4 | Cache Entry |
|---|---|---|---|---|
| Protocol A | | | | |
| | Sender X | | | |
| | | Message Type #1 | | |
| | | | Time | |
| | | | 1.2 | Entry #1 |
| | | | 3.5 | Entry #2 |
| | | | 6.8 | Entry #3 |
| | | Message Type #2 | | |
| | | | Time | |
| | | | 4.7 | Entry #4 |
| | | | 8.9 | Entry #5 |
| | | | 9.8 | Entry #6 |
| | Sender Y | | | |
| | | Message Type #1 | | |
| | | | Time | |
| | | | 0.8 | Entry #7 |
| | | | 2.4 | Entry #8 |
| | | | 5.3 | Entry #9 |
| Protocol B | | | | |
| | Sender X | | | |
| | | Message Type #3 | | |
| | | | Time | |
| | | | 2.3 | Entry #10 |
| | | | 4.8 | Entry #11 |
| | | | 7.2 | Entry #12 |

As shown, the first hash table stores items by protocol name, and the value stored is the second nested hash table. The second hash table stores items by sender identifier, and the value stored is the third nested hash table. One example of suitable sender identifier is an IP address, although the sender identifier may be some other unique identifier that uniquely identifies the sender 102 of the data. This may be an identifier transmitted within the raw binary data.

The third hash table stores the message type, and the value stored is the fourth nested hash table. Protocols are often made up of multiple types of messages each with a unique format and purpose. In some examples, a text string or binary identifier representing the message type is used as the key to this third hash table.

The fourth hash table stores items by time. In some examples, the fourth hash table is sorted to help facilitate chronological playback of the data. The values stored in this hash table are cache entries each of which may store information such as a data index, byte count (number of bytes in the raw binary data) and sender identifier. The data index may represent a numeric primary key that uniquely identifies a record in a database containing the raw binary data, or the position within a flat file representing the location of the raw binary data within the flat file. And again, the sender identifier is an identifier that uniquely identifies the sender 102 of the data, and in some examples, it may identify a row in a database containing more detailed information about the sender.

In some examples, the fourth hash table may include message playback logic (rules) such as a maximum rewind count, maximum rewind time, expiration time and/or playback latest only. A maximum rewind count defines the maximum number of database records or flat file positions to look back when playing backwards, which may limit the amount of data to be requested when messages are spread out. A maximum rewind time defines the maximum time to look back when playing backwards, which may also limit the amount of data to be requested. An expiration time defines the amount of time after the last transmission that the data is to remain valid. And playback latest only logic indicates whether only the latest message needs to be played back or if all messages that have been received over an elapsed time need to be played back.

In some examples, the fourth hash table also includes the sender name, protocol name and message type as human-readable descriptions of respectively the sender, protocol and message type. The fourth hash table may include a last played index that references the last message that was played back, and/or a time of creation that indicates the time of the chronologically first message in the hash table.

Storing data involves making a copy of the raw binary (packet) data and storing it in the persistent storage medium 208. In addition to the binary data, the protocol name, sender identifier, and message type are also stored. This same information is also written into the nested hash tables 216 in RAM 210. If any of the hash tables does not exist at the time that the data is stored in the persistent storage medium, the hash table may be created. The end result is that the protocol name, sender identifier, message type, and data index reside in RAM. The same information may also be stored in the persistent storage medium. The persistent storage medium also has a copy of the raw binary data, whereas the raw binary data is not kept in RAM to free up the RAM resource. By only storing the data index in RAM, the demand for RAM is kept to a minimum and frees up the software architecture 300 to record over significantly longer periods of time than would be possible if all of the binary data was simply kept in RAM.

An interface 328 between the caching module 306 and the persistent storage module 308 may be used to send the raw binary data and its associated metadata, which as described above, may include the protocol name, sender identifier, message type and number of bytes, similar to what is sent over interface 326. The interface 328 may also be used to request storage of the raw binary data in the persistent storage medium 208.

The persistent storage module 308 is to write the raw binary data and associated metadata (e.g., protocol, sender, message type, and number of bytes) to the persistent storage medium 208 such as a physical hard drive. The persistent storage module is also read the data from the persistent storage medium. An interface 330 between the persistent storage module and the persistent storage medium may use one or more conventional application programming interfaces (APIs) to write to and read from the persistent storage medium.

The persistent storage module 308 is connected to the log file input module 310 by an interface 332 over which raw binary data may be sent in response to a database query or file read operation, which may be defined by conventional API(s). In this regard, the log file input module is to read data stored in a previously saved log file and load it back into the software architecture 300. The log file input module is also to retrieve the data that the playback control module needs when the playback control is trying to replay or playback historical data for a given period of time.

In some examples, the log file input module 310 provides a layer of abstraction from the rest of the software architecture 300 by hiding the specifics of a log file's format. It is the log file input module that allows the software architecture to support multiple log file formats. This may be accomplished by embedding specific knowledge of a log file's data structure and layout in this module. The log file input module may extract information and convert it into a form interpretable by both the playback control module 312 and the caching module 306. This abstraction reduces if not minimizes log file specifics to one module (i.e., the log file input module) and to allow the other modules in the architecture to handle data in a generic manner.

An interface 334 between the log file input module 310 and the playback control module 312 may be used to retrieve raw binary data (e.g., specific packets) from the persistent storage medium 208. In some examples, the log file input module requests raw binary data with a specific index that may represent a primary key (e.g., a unique row identifier in a database table) or a position in a file (e.g., a byte offset from the start of the file). Additional information that may or may not be sent over the interface 334 includes the protocol name, the sender identifier, and the message type. In some examples, only the data index is needed to support playback.

The playback control module 312 is to facilitate the replay of data when the user alters the time to a value other than the current world time. In some examples, data replay includes three phases. In the first phase, an indexing phase, what data needs to be played back is determined. When a user requests reconstitution of the state of the simulator 104 at a given point in time set by the user, the playback control module loops over each protocol, sender, and message type to retrieve the last message transmitted before the user chosen time. In some examples, only the data index is retrieved from the hash table at this time.

When a data index is read from fourth hash table, the playback control module 312 may perform a check to determine if the data index is for the message that was already the last played back. To facilitate this, the fourth hash table may provide additional book-keeping to keep track of the last data index played back for each protocol, sender, and message type combination. If it is determined that the data index has already been retrieved (during a previous query), the data index may be ignored, which prevents the retrieval of duplicate and/or redundant data. All other data indexes that pass this check may be put into a list and handed off to the next phase in the process of data replay, the data retrieval phase.

In some examples, one or more protocols, senders or message types also have additional logic that govern how or when the data should be played back, and which as described above, may be defined in the fourth hash table. Some protocols have repetitive data that does not require all data to be played back, and for those protocols, simply processing the last packet transmitted at a given point in time is sufficient to reconstitute the state of the simulator 104. There are also messages that are event driven. These messages are only transmitted once and usually must be played back in order to fully reconstitute the simulator state at a given time. Logic may be applied to the message types to govern how the data should be played back and whether messages can be skipped during the playback or not. In the case of repetitive data, simply retrieving the last data index at a given point in time is sufficient. For event driven data, the software architecture 300 may retrieve all messages between the current time and the previous time from which a query was performed.

In the data retrieval phase, the data indexes are used to retrieve specific raw binary data (e.g., packets of binary data) from the persistent storage medium 208. In some examples in which the raw binary data is stored in a database in the persistent storage medium, the indexes represent primary keys in the database that are used to uniquely identify a row in a table, and the raw binary data will be stored in the database tables to which the primary keys refer. In some examples in which the raw binary data is stored in a flat file in the persistent storage medium, the data indexes represent positions in the file where the raw binary data resides. In either instance, the raw binary data is retrieved from the persistent storage medium and handed off to the third phase, the deserialization phase. Notably, the data indexes need not be continuous (i.e., they may be discontinuous), and the raw binary data may be randomly retrieved, which at least in part enables reverse playback.

In the third, deserialization phase, the retrieved raw binary data is passed to the protocol parsing module 304 to interpret the raw binary data and convert the data into messages that are understandable by the application specific module(s) 322, similar to before. An interface 336 between the playback control module 312 and the protocol parsing module may be used to handoff the raw binary data. In some examples, this raw binary data are packets that represent the set of data that is to be played back in a single time slice (i.e., period of time). The playback control module 312 generates an output of the retrieved binary data for replay to a display device associated with the simulator 104 for simulation of an asset, such as a flight simulator or vehicle simulator. Accordingly, the hash tables including the data index within the persistent storage module 308, the playback control module 312, the time management module 316 and other modules of the system enable replaying historical data from the persistent storage medium 208 while live simulation data may continue to be received and stored, to thereby save resources for performing extensive database queries and enable quick location of simulation data at a particular time for purposes of training a user in simulation.

The three phases of data replay, including the indexing phase, data retrieval phase and deserialization phase, are repeated as time progresses, and without requiring the user to manually move time forward. The user may set the initial point in time and allow the software architecture 300 to progress forward at a fixed rate repeating the three phases using a new time as the query parameter with a time delta applied.

In some examples, the data may be played back in reverse. Playing the data forward may be easily accomplished with data stored in the same sequential manner. When playing in reverse, the software architecture 300 may not simply sequentially play the data backwards because event driven data creates large time gaps between events and its playback may need to look further back in time to determine the last transmitted (or received) event. By organizing the data into the four nested hash tables 216, the software architecture need not scan the persistent storage medium 208 for the last message played of a given protocol, sender and type. Instead, a query into the nested hash tables may be performed to determine the last data index played back prior to a given point in time. Since the raw binary data is indexed using a hash table, the computational expense is no different than when playing the data forward.

In the case of either live or stored, historical data retrieved for playback, an interface 338 between the caching module 306 and the dispatching module 314 may be used to pass the messages to the dispatching module. This interface may also be used to pass a timestamp included with each message.

The dispatching module 314 is used to report live data and/or historical data to other modules of the software architecture 300 for further processing. In some examples, the dispatching module denotes whether the data was received from a live connection (representing current world time) or from historical data. In this manner, the simulator 104 can choose to either process or ignore the data as needs dictate, which is beneficial as both live data and historical data may in some instances be simultaneously flowing through the architecture. The dispatching module may also serve a role in abstracting away the inner workings of other modules from the application specific module(s) 322. The modules that listen to the dispatching module do not require any additional knowledge other than whether messages are from a live source (sender 102) or a playback source (e.g., a log file). This may simplify interface(s) to the application specific module(s) and reduce code complexity.

The dispatching module 314 may be connected to the protocol processing module 318 and data aggregation module 320 by respective interfaces 340 and 342. These interfaces may be used to pass protocol-specific messages, timestamps and the origins of the messages (live or historical).

The protocol processing module 318 is to interpret the messages coming from the dispatching module 314 and act on any of the message contents per requirements of the application specific module(s) 322. In some examples, this may include protocol processing module transforming the protocol specific messages into a common format understandable by the application specific module(s). The protocol processing module then hands off the messages to the application specific module(s) for presentation. This handoff may be accomplished over an interface 344 between the protocol processing module and application specific module(s).

The application specific module(s) 322 include user interface elements or logic for the simulator 104 that act on the messages received from the protocol processing module 318. The application specific module(s) provide the user interface through which the user may alter the time they are interested in which may then be forwarded to the time management module 316, such as over an interface 346 between the application specific module(s) and the time management module. This interface may be used to command and control time in the caching and playback modules. This interface may also be used to control the rate of the playback and the direction of playback (i.e., forward or reverse).

The time management module 316 indicates to the playback control module 312 what point in time the application specific module(s) 322 is presenting. The user of the simulator 104 interacts with its user interface, which in turn tells the time management module what point in time to retrieve data for. The playback control module 312 may use this time as a parameter in determining what raw binary data should be retrieved from the persistent storage medium 208 and ultimately played back. The time management module may also control the rate of playback as well as the direction of playback (i.e., forwards or backwards). The playback control module 312 generates an output of the retrieved binary data for replay to a display device associated with the simulator 104. Accordingly, the hash tables including the data index within the persistent storage module 308 and the playback control module 312 and other modules of the system enable replaying historical data from the persistent storage medium 208 while live simulation data may continue to be received and stored.

Also connected to the dispatching module 314, the data aggregation module 320 is to collect data for post analysis. The data aggregation module may often only look for live messages as each may only be processed once. When the user reports through the time management module 316 that they want to go back in time, both live and historical messages may flow to the dispatching module 314. The dispatching module may then inform the data aggregation module whether it is working with live data (which the data aggregation module may care about) or historical data (which has already been processed by the data aggregation module—when it was live data).

Figure 4:
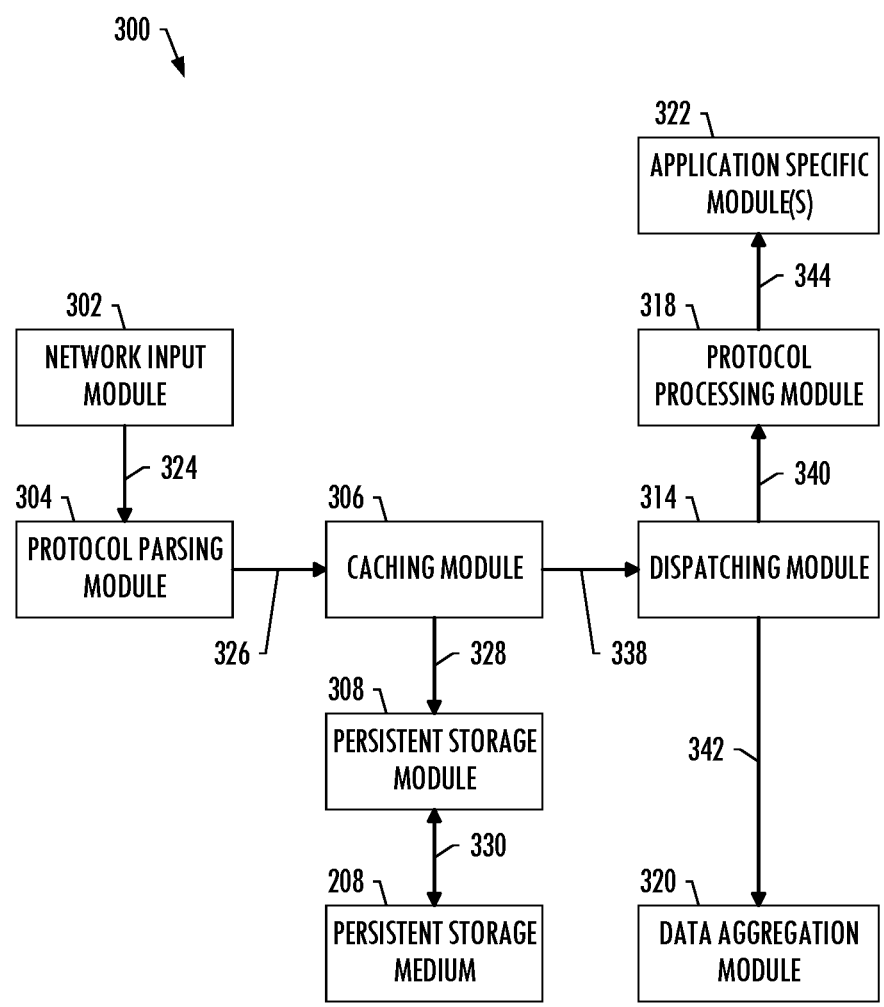
FIGS. 4 and 5 illustrate operation of the software architecture in the case of respectively only live data and only historical data, according to some example implementations.
Figure 5:
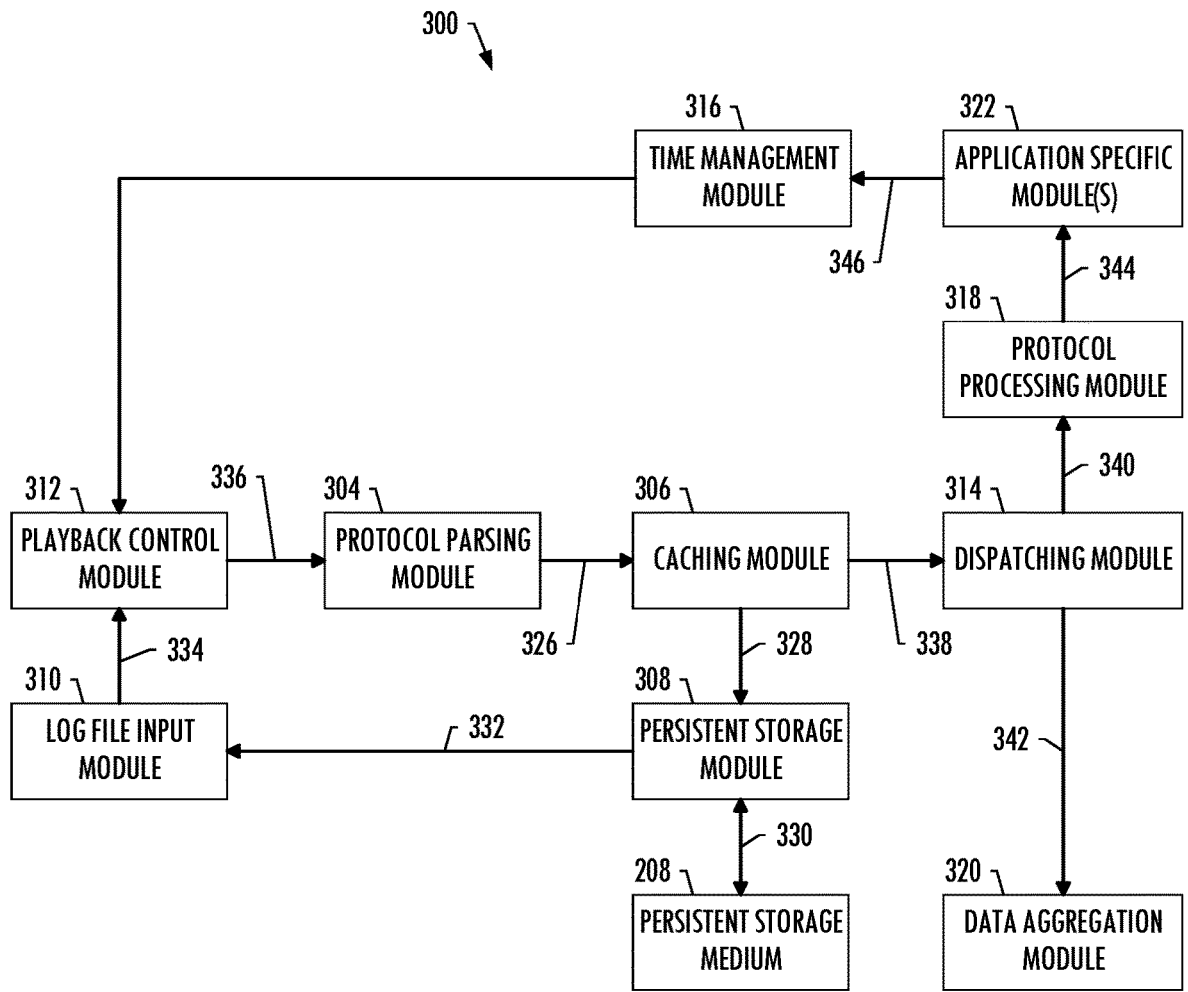

To further illustrate the software architecture 300, FIGS. 4 and 5 illustrate operation of the software architecture in the case of respectively only live data and only historical data, according to some example implementations. FIG. 3 may be referenced to illustrate operation of the software architecture in the case of both live data and historical data.

Referring to FIG. 3, in the case of only live data, the software architecture 300 is only processing live data and has not been requested by the user to present historical data. Time is current world time. In this use case, the playback control module 312 need not run as all data is coming in live from the network input module 302. Raw binary data is parsed by the protocol parsing module 304 and turned into protocol specific messages. These messages are handed off to the caching module 306 which dispatches the messages to the rest of the software architecture via the dispatching module 314. In addition, the protocol parsing module also hands off a copy of the raw binary data with its associated metadata to store the raw binary data in the persistent storage medium 208 for later retrieval.

As shown in FIG. 4, in the case of only historical data, the software architecture 300 is only playing data back from a log file (i.e., persistent storage 208). In this case, the network input module 302 need not run as no live data is being received or processed. One or more playback control modules 312 are instantiated to facilitate retrieval and playback of the historical data from the persistent storage medium 208. The playback control module may run in a separate background thread so as not to burden the primary user interface thread that handles user requests (e.g., mouse clicks, displays, etc.).

The playback control module 312 may operate in a looping manner running at a rate commensurate with the protocol needs (e.g., 20-30 Hz). During each loop, the playback control module may examine the four nested hash tables 216 in RAM 210 to determine what data needs to be retrieved from the persistent storage medium 208. It accomplishes this by looping through each protocol, sender, and message type. The playback control module may use the time reported by the time management module 316 to determine the time window to retrieve messages for. Playback logic (in the fourth hash table) that limits what raw binary data should be played back may also be applied.

After collecting the data indexes representing the data to be played back, the playback control module 312 may request the data from the persistent storage medium 208 in the data retrieval phase of data replay. As or after the data has been retrieved, the raw binary data is handed off to the protocol parsing module 304 and turned into protocol-specific messages. These messages are then handed off from the caching module 306 to the dispatching module 314 which dispatches the data to the rest of the software architecture including the application specific module(s) 322.

Briefly referring back to FIG. 3, in the case of both live and historical data, the user is still collecting live data but has requested the retrieval and presentation of historical data. In this use case, the software architecture 300 continues to receive and store the live data while also retrieving and replaying historical data from the persistent storage medium 208. These operations may be performed similar to described above, including in a combination of the use cases described with reference to FIGS. 4 and 5.

Figure 6:
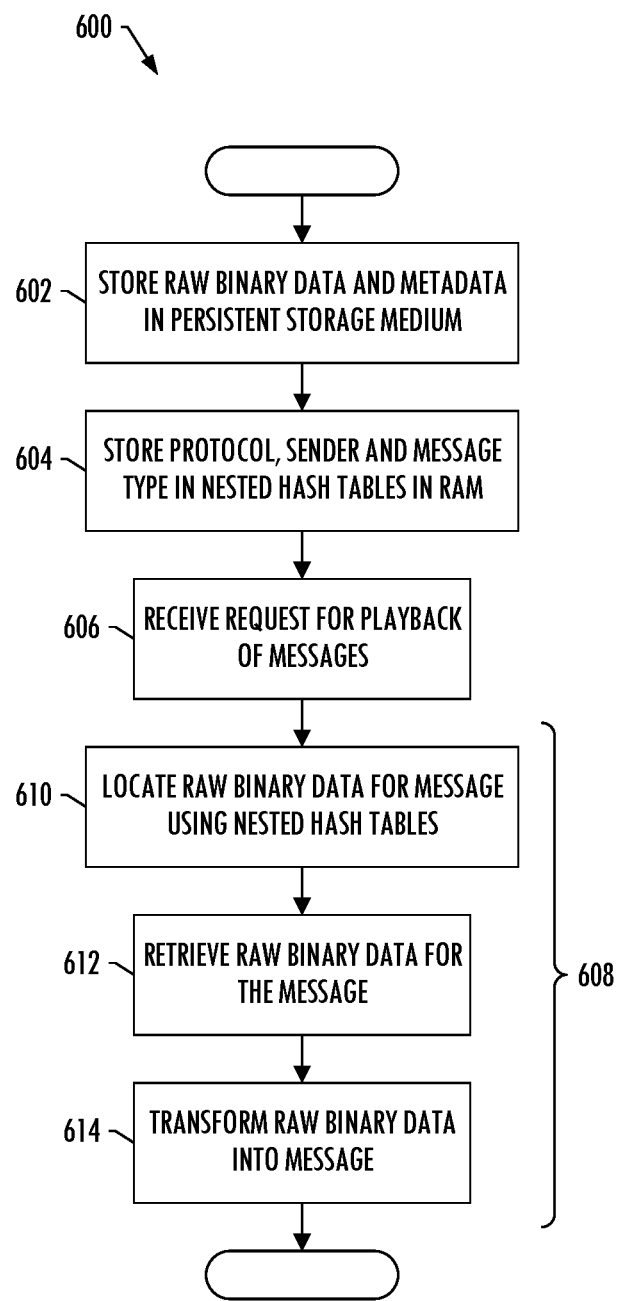
FIG. 6 illustrates a flowchart including various operations of a method of simulation of an asset to train a user to use the asset, according to some example implementations.

FIG. 6 illustrates a flowchart including various operations of a method 600 of simulation of an asset to train a user to use the asset, according to some example implementations. As shown at block 602, the method includes storing, in a persistent storage medium 208, raw binary data 212 transformable into messages associated with simulation of the asset. The persistent storage medium stores the raw binary data with associated metadata 214 that identifies a protocol, sender and message type of the messages by respectively a protocol name, sender identifier and message type.

The method includes storing, in RAM 210, the protocol name, sender identifier and message type, and excluding the raw binary data, as shown in block 604. The RAM stores the protocol name, sender identifier and message type in respective hash tables of four nested hash tables 216 further including a fourth hash table. This fourth hash table maps points in time of the messages to respective data indices that identify respective locations in the persistent storage medium 208 at which the raw binary data 212 for the messages are stored.

The method includes receiving a request for playback of a portion of the messages from a selected point in time that is earlier than a time at which the request is received, and responding to the request, as shown at block 606 and at 608.

For each point in time of a plurality of points in time including and from the selected point in time, responding to the request incudes a processor locating the raw binary data for a message whose point in time is chronologically last before the point in time using the four nested hash tables in the RAM and without access to the persistent storage medium, as shown at block 610. This includes looping over the protocol name, sender identifier and message type in the respective hash tables 216 to identify a data index in the fourth hash table that identifies a location in the persistent storage medium 208 at which the raw binary data 212 for the message is stored. The processor also retrieves the raw binary data for the message from the location in the persistent storage medium using the data index, and transforming the raw binary data into the message for presentation in connection with simulation of the asset to train the user to use the asset, as shown at respectively blocks 612 and 614.

As described above with reference to FIG. 2, the apparatus 200 configured to implement a sender 102 or the simulator 104 may include a processor 202 connected to memory 204 and user input interface 206. The memory may include a persistent storage medium 208 and RAM 210. The apparatus may also include a display device 218 and communication interface 220.

The processor 202 is generally any piece of computer hardware that is capable of processing information such as, for example, data, computer programs and/or other suitable electronic information. The processor is composed of a collection of electronic circuits some of which may be packaged as an integrated circuit or multiple interconnected integrated circuits (an integrated circuit at times more commonly referred to as a "chip"). The processor may be configured to execute computer programs, which may be stored onboard the processor or otherwise stored in the memory 204 (of the same or another apparatus).

The processor 202 may be a number of processors, a multi-processor core or some other type of processor, depending on the particular implementation. Further, the processor may be implemented using a number of heterogeneous processor systems in which a main processor is present with one or more secondary processors on a single chip. As another illustrative example, the processor may be a symmetric multi-processor system containing multiple processors of the same type. In yet another example, the processor may be embodied as or otherwise include one or more application-specific integrated circuits (ASICs), field programmable gate arrays (FPGAs) or the like. Thus, although the processor may be capable of executing a computer program to perform one or more functions, the processor of various examples may be capable of performing one or more functions without the aid of a computer program.

The memory 204 is generally any piece of computer hardware that is capable of storing information such as, for example, data, computer programs (e.g., computer-readable program code) and/or other suitable information either on a temporary basis and/or a permanent basis. This may include one or more computer programs to implement the software architecture 300. The memory may include the non-volatile persistent storage medium 208 and RAM 210. Examples of suitable persistent storage in particular include a hard drive, flash memory, optical disk or some combination of the above. Optical disks may include compact disk-read/write (CD-R/W), DVD or the like. In various instances, the memory may be referred to as a computer-readable storage medium. The computer-readable storage medium is a non-transitory device capable of storing information, and is distinguishable from computer-readable transmission media such as electronic transitory signals capable of carrying information from one location to another. Computer-readable medium as described herein more generally refers to a computer-readable storage medium or computer-readable transmission medium.

The user input interface 206 may be wired or wireless, and may be configured to receive information from a user into the apparatus 200, such as for processing, storage and/or display. Suitable examples of user input interfaces include a microphone, image or video capture device, keyboard or keypad, joystick, touch-sensitive surface (separate from or integrated into a touchscreen), biometric sensor or the like. The user input interface is a particular type of user interface may also include one or more interfaces for communicating with peripherals such as printers, scanners or the like.

The user interfaces may further include the display device 218. The display device may be configured to present or otherwise display information to a user, suitable examples of which include a liquid crystal display (LCD), light-emitting diode display (LED), plasma display panel (PDP) or the like.

The communication interface 220 may be configured to transmit and/or receive information, such as to and/or from other apparatus(es), network(s) or the like. The communication interface may be configured to transmit and/or receive information by physical (wired) and/or wireless communications links. Examples of suitable communication interfaces include a network interface controller (NIC), wireless NIC (WNIC) or the like.

As indicated above, program code instructions may be stored in memory, and executed by a processor, to implement functions of the systems, subsystems and their respective elements described herein. As will be appreciated, any suitable program code instructions may be loaded onto a computer or other programmable apparatus from a computer-readable storage medium to produce a particular machine, such that the particular machine becomes a means for implementing the functions specified herein. These program code instructions may also be stored in a computer-readable storage medium that can direct a computer, a processor or other programmable apparatus to function in a particular manner to generate a particular machine or particular article of manufacture. The instructions stored in the computer-readable storage medium may produce an article of manufacture, where the article of manufacture becomes a means for implementing functions described herein. The program code instructions may be retrieved from a computer-readable storage medium and loaded into a computer, processor or other programmable apparatus to configure the computer, processor or other programmable apparatus to execute operations to be performed on or by the computer, processor or other programmable apparatus.

Retrieval, loading and execution of the program code instructions may be performed sequentially such that one instruction is retrieved, loaded and executed at a time. In some example implementations, retrieval, loading and/or execution may be performed in parallel such that multiple instructions are retrieved, loaded, and/or executed together. Execution of the program code instructions may produce a computer-implemented process such that the instructions executed by the computer, processor or other programmable apparatus provide operations for implementing functions described herein.

Execution of instructions by a processor, or storage of instructions in a computer-readable storage medium, supports combinations of operations for performing the specified functions. In this manner, an apparatus 200 may include a processor 202 and a computer-readable storage medium or memory 204 coupled to the processor, where the processor is configured to execute computer-readable program code stored in the memory. It will also be understood that one or more functions, and combinations of functions, may be implemented by special purpose hardware-based computer systems and/or processors which perform the specified functions, or combinations of special purpose hardware and program code instructions.

Many modifications and other implementations of the disclosure set forth herein will come to mind to one skilled in the art to which the disclosure pertains having the benefit of the teachings presented in the foregoing description and the associated drawings. Therefore, it is to be understood that the disclosure is not to be limited to the specific implementations disclosed and that modifications and other implementations are intended to be included within the scope of the appended claims. Moreover, although the foregoing description and the associated drawings describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An apparatus for simulation of an asset to train a user to use the asset, the apparatus comprising:
    a persistent storage medium configured to store raw binary data transformable into messages associated with simulation of the asset, the persistent storage medium being configured to store the raw binary data with associated metadata that identifies a protocol for use in simulation of the asset by a protocol name, a sender of the messages by a sender identifier, and a type of the messages by a message type;
    a random access memory (RAM) configured to store the protocol name, sender identifier and message type, and excluding the raw binary data, the RAM being configured to store the protocol name, sender identifier and message type in respective hash tables of four nested hash tables further including a fourth hash table that maps points in time of the messages to respective data indices that identify respective locations in the persistent storage medium at which the raw binary data for the messages are stored;
    a user input interface configured to receive a request for playback of a portion of the messages from a selected point in time that is earlier than a time at which the request is received; and
    a processor configured to execute computer-readable program code to cause the apparatus to respond to the request, including for each point in time of a plurality of points in time including and from the selected point in time, the apparatus being caused to at least:
    locate the raw binary data for a message whose point in time is chronologically last before the point in time using the four nested hash tables in the RAM and without access to the persistent storage medium, including the apparatus being caused to loop over the protocol name, sender identifier and message type in the respective hash tables to identify a data index in the fourth hash table that identifies a location in the persistent storage medium at which the raw binary data for the message is stored;
    retrieve the raw binary data for the message from the location in the persistent storage medium using the data index; and
    transform the raw binary data into the message for presentation in connection with simulation of the asset to train the user to use the asset.

2. The apparatus of claim 1 further comprising:
    a display device configured to present the message for each point in time of the plurality of points in time.

3. The apparatus of claim 1, wherein the messages include messages of multiple protocols, senders or message types, and
    wherein the apparatus being caused to locate the raw binary data, retrieve the raw binary data and transform the raw binary data includes being caused to locate the raw binary data, retrieve the raw binary data and transform the raw binary data for the message of each combination of protocol, sender and message type that is chronologically last before the point in time.

4. The apparatus of claim 1, wherein the messages include messages of multiple protocols, senders or message types, and the apparatus being caused to locate the raw binary data includes being caused to locate the raw binary data for the message of each combination of protocol, sender and message type whose point in time is chronologically last before the point in time, and wherein the apparatus being caused to retrieve the raw binary data for the message incudes for the message of each combination of protocol, sender and message type, the apparatus being caused to at least:

compare the data index for the raw binary data for the message of the combination of protocol, sender and message type with a last presented index that identifies the data index for the raw binary data for a last presented message of the combination of protocol, sender and message type; and retrieve the raw binary data for the message of the combination of protocol, sender and message type only when the data index and the last presented index are different.

5. The apparatus of claim 1, wherein the plurality of points in time are earlier than the selected point in time and in reverse chronological order.

6. The apparatus of claim 1, wherein the messages associated with simulation of the asset include messages for presentation at a predetermined rate, and wherein the apparatus being caused to transform the raw binary data includes being caused to transform the raw binary data into the message for presentation at a rate that is different from the predetermined rate over the plurality of points in time including and from the selected point in time.

7. The apparatus of claim 1, wherein the fourth hash table maps the points in time of the messages to respective cache entries that store the respective data indices and any logic for presentation of messages of a particular protocol, sender or message type, and wherein for at least one message of the particular protocol, sender or message type, the apparatus being caused to locate the raw binary data for the message includes being caused to locate the raw binary data according to the logic.

8. The apparatus of claim 1, wherein the raw binary data is historical raw binary data, the messages are historical messages, and the apparatus further comprises a communication interface configured to receive live raw binary data transformable into live messages associated with simulation of the asset, and wherein the processor is configured to execute computer-readable program code to cause the apparatus to further at least:

transform the live raw binary data into the live messages;

populate the four nested hash tables in the RAM with the protocol name, sender identifier and message type of the live messages, and with points in time of the live messages, the fourth hash table mapping the points in time of the live messages to respective data indices that identify respective locations in the persistent storage medium in which to store the live raw binary data for the live messages; and write the live raw binary data to the respective locations in the persistent storage medium with associated metadata that identifies the protocol name, sender identifier and message type of the live messages, the live raw binary data and live messages thereafter being historical raw binary data and historical messages.

9. A method of simulation of an asset to train a user to use the asset, the method comprising:

storing, in a persistent storage medium, raw binary data transformable into messages associated with simulation of the asset, the persistent storage medium storing the raw binary data with associated metadata that identifies a protocol for use in simulation of the asset by a protocol name, a sender of the messages by a sender identifier, and a type of the messages by a message type;

storing, in a random access memory (RAM), the protocol name, sender identifier and message type, and excluding the raw binary data, the RAM storing the protocol name, sender identifier and message type in respective hash tables of four nested hash tables further including a fourth hash table that maps points in time of the messages to respective data indices that identify respective locations in the persistent storage medium at which the raw binary data for the messages are stored;

receiving a request for playback of a portion of the messages from a selected point in time that is earlier than a time at which the request is received; and responding to the request, including for each point in time of a plurality of points in time including and from the selected point in time, a processor at least:

locating the raw binary data for a message whose point in time is chronologically last before the point in time using the four nested hash tables in the RAM and without access to the persistent storage medium, including looping over the protocol name, sender identifier and message type in the respective hash tables to identify a data index in the fourth hash table that identifies a location in the persistent storage medium at which the raw binary data for the message is stored;

retrieving the raw binary data for the message from the location in the persistent storage medium using the data index; and transforming the raw binary data into the message for presentation in connection with simulation of the asset to train the user to use the asset.

10. The method of claim 9 further comprising:

presenting, on a display device, the message for each point in time of the plurality of points in time.

11. The method of claim 9, wherein the messages include messages of multiple protocols, senders or message types, and wherein locating the raw binary data, retrieving the raw binary data and transforming the raw binary data includes locating the raw binary data, retrieving the raw binary data and transforming the raw binary data for the message of each combination of protocol, sender and message type that is chronologically last before the point in time.

12. The method of claim 9, wherein the messages include messages of multiple protocols, senders or message types, and locating the raw binary data includes locating the raw binary data for the message of each combination of protocol, sender and message type whose point in time is chronologically last before the point in time, and wherein retrieving the raw binary data for the message incudes for the message of each combination of protocol, sender and message type, the processor at least:

comparing the data index for the raw binary data for the message of the combination of protocol, sender and message type with a last presented index that identifies the data index for the raw binary data for a last presented message of the combination of protocol, sender and message type; and retrieving the raw binary data for the message of the combination of protocol, sender and message type only when the data index and the last presented index are different.

13. The method of claim 9, wherein the plurality of points in time are earlier than the selected point in time and in reverse chronological order.

14. The method of claim 9, wherein the messages associated with simulation of the asset include messages for presentation at a predetermined rate, and
wherein transforming the raw binary data includes transforming the raw binary data into the message for presentation at a rate that is different from the predetermined rate over the plurality of points in time including and from the selected point in time.

15. The method of claim 9, wherein the fourth hash table maps the points in time of the messages to respective cache entries that store the respective data indices and any logic for presentation of messages of a particular protocol, sender or message type, and
wherein for at least one message of the particular protocol, sender or message type, locating the raw binary data for the message includes locating the raw binary data according to the logic.

16. The method of claim 9, wherein the raw binary data is historical raw binary data, the messages are historical messages, and the method further comprises:
receiving live raw binary data transformable into live messages associated with operation of the;
transforming the live raw binary data into the live messages;
populating the four nested hash tables in the RAM with the protocol name, sender identifier and message type of the live messages, and with points in time of the live messages, the fourth hash table mapping the points in time of the live messages to respective data indices that identify respective locations in the persistent storage medium in which to store the live raw binary data for the live messages; and
writing the live raw binary data to the respective locations in the persistent storage medium with associated metadata that identifies the protocol name, sender identifier and message type of the live messages, the live raw binary data and live messages thereafter being historical raw binary data and historical messages.

17. A computer-readable storage medium for simulation of an asset to train a user to use the asset, the computer-readable storage medium being non-transitory and having computer-readable program code portions stored therein that in response to execution by a processor, cause an apparatus to at least:
store, in a persistent storage medium, raw binary data transformable into messages associated with simulation of the asset, the persistent storage medium being configured to store the raw binary data with associated metadata that identifies a protocol for use in simulation of the asset by a protocol name, a sender of the messages by a sender identifier, and a type of the messages by a message type;
store, in a random access memory (RAM), the protocol name, sender identifier and message type, and excluding the raw binary data, the RAM being configured to store the protocol name, sender identifier and message type in respective hash tables of four nested hash tables further including a fourth hash table that maps points in time of the messages to respective data indices that identify respective locations in the persistent storage medium at which the raw binary data for the messages are stored;
receive a request for playback of a portion of the messages from a selected point in time that is earlier than a time at which the request is received; and
respond to the request, including for each point in time of a plurality of points in time including and from the selected point in time, the apparatus being caused to at least:
locate the raw binary data for a message whose point in time is chronologically last before the point in time using the four nested hash tables in the RAM and without access to the persistent storage medium, including the apparatus being caused to loop over the protocol name, sender identifier and message type in the respective hash tables to identify a data index in the fourth hash table that identifies a location in the persistent storage medium at which the raw binary data for the message is stored;
retrieve the raw binary data for the message from the location in the persistent storage medium using the data index; and
transform the raw binary data into the message for presentation in connection with simulation of the asset to train the user to use the asset.

18. The computer-readable storage medium of claim 17 having computer-readable program code portions stored therein that in response to execution by the processor, cause the apparatus to further:
present, on a display device, the message for each point in time of the plurality of points in time.

19. The computer-readable storage medium of claim 17, wherein the messages include messages of multiple protocols, senders or message types, and
wherein the apparatus being caused to locate the raw binary data, retrieve the raw binary data and transform the raw binary data includes being caused to locate the raw binary data, retrieve the raw binary data and transform the raw binary data for the message of each combination of protocol, sender and message type that is chronologically last before the point in time.

20. The computer-readable storage medium of claim 17, wherein the messages include messages of multiple protocols, senders or message types, and the apparatus being caused to locate the raw binary data includes being caused to locate the raw binary data for the message of each combination of protocol, sender and message type whose point in time is chronologically last before the point in time, and
wherein the apparatus being caused to retrieve the raw binary data for the message incudes for the message of each combination of protocol, sender and message type, the apparatus being caused to at least:
compare the data index for the raw binary data for the message of the combination of protocol, sender and message type with a last presented index that identifies the data index for the raw binary data for a last presented message of the combination of protocol, sender and message type; and
retrieve the raw binary data for the message of the combination of protocol, sender and message type only when the data index and the last presented index are different.

21. The computer-readable storage medium of claim 17, wherein the plurality of points in time are earlier than the selected point in time and in reverse chronological order.

22. The computer-readable storage medium of claim 17, wherein the messages associated with simulation of the asset include messages for presentation at a predetermined rate, and wherein the apparatus being caused to transform the raw binary data includes being caused to transform the raw binary data into the message for presentation at a rate that is different from the predetermined rate over the plurality of points in time including and from the selected point in time.

23. The computer-readable storage medium of claim 17, wherein the fourth hash table maps the points in time of the messages to respective cache entries that store the respective data indices and any logic for presentation of messages of a particular protocol, sender or message type, and wherein for at least one message of the particular protocol, sender or message type, the apparatus being caused to locate the raw binary data for the message includes being caused to locate the raw binary data according to the logic.

24. The computer-readable storage medium of claim 17, wherein the raw binary data is historical raw binary data, the messages are historical messages, and the apparatus further comprises a communication interface configured to receive live raw binary data transformable into live messages associated with simulation of the asset, and wherein the computer-readable storage medium has computer-readable program code portions stored therein that in response to execution by the processor, cause the apparatus to further at least:

transform the live raw binary data into the live messages;
populate the four nested hash tables in the RAM with the protocol name, sender identifier and message type of the live messages, and with points in time of the live messages, the fourth hash table mapping the points in time of the live messages to respective data indices that identify respective locations in the persistent storage medium in which to store the live raw binary data for the live messages; and write the live raw binary data to the respective locations in the persistent storage medium with associated metadata that identifies the protocol name, sender identifier and message type of the live messages, the live raw binary data and live messages thereafter being historical raw binary data and historical messages.

25. The apparatus of claim 1, wherein the RAM is configured to store the protocol name, sender identifier and message type that are keys of the respective hash tables including a first hash table, a second hash table and a third hash table, and wherein the first hash table maps a first of the keys to a value that is a second of the keys, the second hash table maps the second of the keys to a value that is a third of the keys, and the third hash table maps the third of the keys to values that are points in time that are keys of the fourth hash table.

26. The method of claim 9, wherein storing the protocol name, sender identifier and message type includes storing the protocol name, sender identifier and message type that are keys of the respective hash tables including a first hash table, a second hash table and a third hash table, and wherein the first hash table maps a first of the keys to a value that is a second of the keys, the second hash table maps the second of the keys to a value that is a third of the keys, and the third hash table maps the third of the keys to values that are points in time that are keys of the fourth hash table.

27. The computer-readable storage medium of claim 17, wherein the apparatus is caused to store the protocol name, sender identifier and message type that are keys of the respective hash tables including a first hash table, a second hash table and a third hash table, and wherein the first hash table maps a first of the keys to a value that is a second of the keys, the second hash table maps the second of the keys to a value that is a third of the keys, and the third hash table maps the third of the keys to values that are points in time that are keys of the fourth hash table.

* * * * *